US005078816A

United States Patent [19]

Ratermann

[11] Patent Number: 5,078,816

[45] Date of Patent: Jan. 7, 1992

[54] MERCHANDISING LABEL PRINTER/APPLIER

[75] Inventor: Philip A. Ratermann, Troy, Ohio

[73] Assignee: Premark FEG Corporation, Troy, Ohio

[21] Appl. No.: 546,992

[22] Filed: Jul. 2, 1990

Related U.S. Application Data

[62] Division of Ser. No. 175,090, Mar. 31, 1989, abandoned.

[51] Int. Cl.[5] .............................................. B32B 31/00

[52] U.S. Cl. ....................................... 156/64; 156/360; 156/351; 156/384

[58] Field of Search ................. 156/64, 384, 351, 354, 156/355, 361, 362, 363, 360, 357, 244.27

[56] References Cited

U.S. PATENT DOCUMENTS

| | | | |
|---|---|---|---|
| 4,276,112 | 6/1981 | French et al. | 156/360 |
| 4,321,103 | 3/1982 | Lindstrom et al. | 156/351 |
| 4,585,506 | 4/1986 | Matsuguchi | 156/361 |
| 4,615,757 | 10/1986 | Treiber | 156/360 |
| 4,867,833 | 10/1989 | McCoy | 156/361 |

*Primary Examiner*—David A. Simmons

*Assistant Examiner*—Robert Barker

*Attorney, Agent, or Firm*—Russell L. McIlwain; William Weigl

[57] ABSTRACT

A method and apparatus are disclosed for printing and applying labels to packages which can vary in height over a large range, for example from a minimum height of 0.5 inches to and including a maximum height of 5.5 inches. A label applier is pivotally mounted and gravity biased toward a lowermost position adjacent a package conveyor with the label applier being upwardly pivoted by packages passing thereunder to accommodate the wide range of package heights. Packages are sensed on the conveyor as they move toward the label applier which prints and holds labels with the adhesive coated sides of the labels unexposed until the expiration of periods of time based upon package sensing. By timing label application to occur upon the expiration of such time periods, the labels are applied to preferred areas of the upper surfaces of the packages adjacent either the leading side edges or the trailing side edges of the packages as defined by direction of package conveyance. The label applier also can move laterally relative to the package conveyor to further define the preferred areas of label application on the top surfaces of the packages.

3 Claims, 5 Drawing Sheets

MERCHANDISING LABEL PRINTER/APPLIER

This is a division of application Ser. No. 175,090, filed Mar. 31, 1989, now abandoned.

BACKGROUND OF THE INVENTION

The present invention relates generally to package labeling and, more particularly, to a method and apparatus for labeling packages having a substantial height range as they are carried along a conveyor with the labels being applied to selected preferred areas of the packages.

A large variety of package labeling systems are known and used, for example, in supermarkets for labeling meats, produce, and other food items. Such labeling systems range from completely manual wherein labels are hand applied to packages either directly or by means of a hand-held labeling "gun", to the fully automatic wherein packages are labeled at a labeling station while the packages are momentarily stopped at the station or passing by. These labeling systems apply a variety of labels with the most common and necessary being pricing labels which display the price, weight, grade identification, and the like. In modern supermarkets, pricing labels also include a UPC bar code which can be used to directly scan the price to be charged for the product.

Another common variety of label is a merchandising label which is used to provide additional information to a consumer by identifying appealing characteristics of the product. For example, hamburger may be designated as "fresh ground", pork chops as "thin cut", a certain roast beef indicated as the "special of the day", and so forth. Merchandising labels are typically purchased preprinted in bright or fluorescent colors to attract consumers' attention and are hand applied to packages wrapped and price labeled prior to application of the merchandising labels. Preprinted merchandising labels create obvious inventory problems and, when hand applied, are labor intensive and may not be consistently applied due to slothfulness or time pressures.

Such merchandising labels also can be applied by means of labeler "guns" or automatic labelers, for example, as disclosed in U.S. Pat. No. 4,615,757 which issued Oct. 7, 1986, to Fritz F. Treiber. Treiber's merchandising labeler can be used alone; however, as disclosed it is used in conjunction with a pricing labeler. Both the merchandising labeler and the pricing labeler are incorporated into a packaging system and positioned over the elevator of an elevating wrapping machine such that a pricing label and a merchandising label are applied to a package as it is being wrapped. In Treiber, both labelers are horizontally movable relative to packages to be labeled with the movement being responsive to package dimensions which define the side edges of the packages.

While Treiber's labeling arrangement could be adapted to operate with package conveyors, horizontal shifting in both the lateral and longitudinal directions would greatly increase the complexity of any apparatus including his labelers. It is further apparent that if his merchandising labeler was used with a package conveyor, the labeler head would have to be positioned at an elevation substantially equal to the upper surface of packages to be conveyed thereunder. If the labeler head hangs down below the upper surface of packages to be labeled, the packages would engage the label backing material which tends to adhere tenaciously to plastic wrapping materials commonly employed in supermarkets. It is thus apparent that Treiber's merchandising labeler could not accommodate a substantial range of package heights if used with a package conveyor.

Another problem associated with applying merchandising labels is the coordination of such labels with pricing labels or other labels which are applied to the packages. This should be no problem with manual application or Treiber's labelers because of their fixed orientations relative to one another; however, if two or more different labels are applied to packages by separate and distinct labelers, the labelers must be coordinated with one another to place labels such that they do not overlap or otherwise interfere with one another.

A need exists for a method and apparatus for applying labels to packages as they are carried along a conveyor wherein a substantial range of package heights can be accommodated without requiring height adjustments of the labeler and the labels can also be positioned within preferred areas of the upper surfaces of the packages. Such labeling method and apparatus could be used to apply a variety of labels including pricing labels and would be particularly applicable to merchandising labels. Preferably, such a label applying method and apparatus could be easily adapted to function with existing price labeling systems such that merchandising labels could be applied before or after pricing labels in complementary preferred areas of the upper surfaces of the packages.

SUMMARY OF THE INVENTION

It is a primary object of the present invention to provide a method and apparatus for applying labels to packages having a wide range of package heights as those packages are carried along a conveyor. The label applier is biased by gravity toward a lowermost position adjacent the conveyor and is movable by packages passing thereunder to accommodate a wide range of package heights, for example, from 0.5 to 5.5 inches. Packages are sensed on the conveyor as they move toward the label applier and labels are applied upon the expiration of periods of time based upon package sensing such that the labels are applied to preferred areas of the top surfaces of packages. For example, the preferred areas may be adjacent either the leading side edges or the trailing side edges of the packages as defined by the direction of package conveyance.

Preferably the labels are printed by the label applier and held such that the adhesive coated sides of the labels are not exposed until the labels are to be applied, i.e., after the expiration of the periods of time based upon package sensing. The label application of the present invention facilitates packaging, handling, display and sale of packages and is equally applicable to a variety of labels including price labels and merchandising labels, although it is particularly applicable to merchandising labels since it can be readily associated with existing price labeling methods and apparatus.

In accordance with one aspect of the present invention, a method for applying labels to substantially rectangular packages as they are carried along a conveyor comprises the steps of: positioning a label applier over a package with the label applier gravity biased toward a lowermost position adjacent the conveyor but movable by packages passing thereunder to accommodate a substantial range of package heights; sensing packages on the conveyor as they move toward the label applier; and applying labels upon the expiration of periods of time based upon package sensing such that the labels are applied to preferred areas on the top surfaces of the packages, for example, adjacent either leading side edges or trailing side edges of the packages. The method preferably further comprises the step of laterally moving the label applier relative to the conveyor to define the preferred areas of label application laterally. If random weight pricing labels are to be applied or if merchandising labels are to be most efficiently applied, the label applying method further comprises the step of printing labels upon sensing packages on the conveyor. By making the gravity biased label applier movable by packages passing thereunder, a wide range of package heights, for example from 0.5 to 5.5 inches, can be accommodated.

In accordance with another aspect of the present invention, a method for printing and applying labels to substantially rectangular packages comprises the steps of: pivotally mounting a label printing and applying arm over a package conveyor with the arm extending in the direction of package conveyance and being biased by gravity toward a lowermost position adjacent the conveyor such that it is pivoted upwardly by packages moving thereunder to accommodate a substantial range of package heights; supporting a supply of label stock comprising pressure-sensitive labels carried upon a backing strip; passing the label stock along the arm between a backing roller and a print head with the labels being positioned toward the print head and the label stock then progressing around a label stripper bar; collecting the spent backing strip as labels are stripped therefrom and it extends beyond the stripper bar; mounting a stepper motor to drive the backing roller to advance or retract the label stock; sensing packages to be labeled as they are conveyed toward the label printing and applying arm; printing a label upon sensing a package by controlling the stepper motor to advance the label stock and operating said print head synchronously with the stepper motor to print a label passing over the print head; holding the printed label secured to the backing strip adjacent the label stripper bar at the distal end of the label printing and applying arm; timing from the sensing of the package; operating the stepper motor to advance the label stock to move the printed label to a label application position beyond the stripper bar at a selected time after sensing the package and holding the printed label at the label application position for a period of time to thereby apply the printed label to the package in a preferred area of its top surface, for example, adjacent either a leading side edge or trailing side edge of the package, with the next adjacent unprinted label being partially moved beyond the print head; and operating the stepper motor to retract the label stock to reposition the next adjacent unprinted label to a print position beneath the print head such that the information to be printed on that unprinted label can be different from the information of the immediately preceding label.

In accordance with yet another aspect of the present invention, a system for applying labels to substantially rectangular packages comprises labeler means for applying labels to packages carried along a conveyor wherein the labeler means is positioned over the conveyor, biased by gravity toward a lowermost position adjacent the conveyor and mounted such that packages passing thereunder move the labeler means such that it can accommodate a substantial range of package heights. Sensor means are provided for sensing packages as they move along the conveyor. Control means are connected to the sensor means and the labeler means for activating the labeler means at selected time periods after packages are sensed such that labels are applied to preferred top surface areas of the packages, for example, adjacent either leading side edges or trailing side edges of the packages. The labeler means preferably comprises a pivotally mounted labeling arm, a supply spindle for receiving a spool of label stock comprising pressure sensitive labels carried upon a backing strip, a label stripper bar mounted at the distal end of the labeling arm, drive means for engaging and moving the label stock and a take up spindle for receiving the spent backing strip after labels are removed therefrom.

To extend the applications and utility of the label applying system, it preferably provides for printing the labels with the drive means comprising a backing roller and a print head receiving the label stock therebetween with the labels being positioned toward the print head. A stepper motor is coupled to the backing roller to advance or retract the label stock. To help ensure that labels applied by the label applying system properly adhere to packages, the system further comprises label smoothing means extending beyond the label stripper bar for engaging and evenly pressing labels against packages to which they are applied. The label smoothing means preferably comprises a downwardly extending tapered brush. To permit the labeler means to be easily moved by packages passing thereunder, the label applying arm preferably includes sled runners positioned along the bottom sides thereof.

Other objects and advantages of the present invention will be apparent from the following description, the accompanying drawings, and the appended claims.

DETAILED DESCRIPTION OF THE INVENTION

Figure 1:
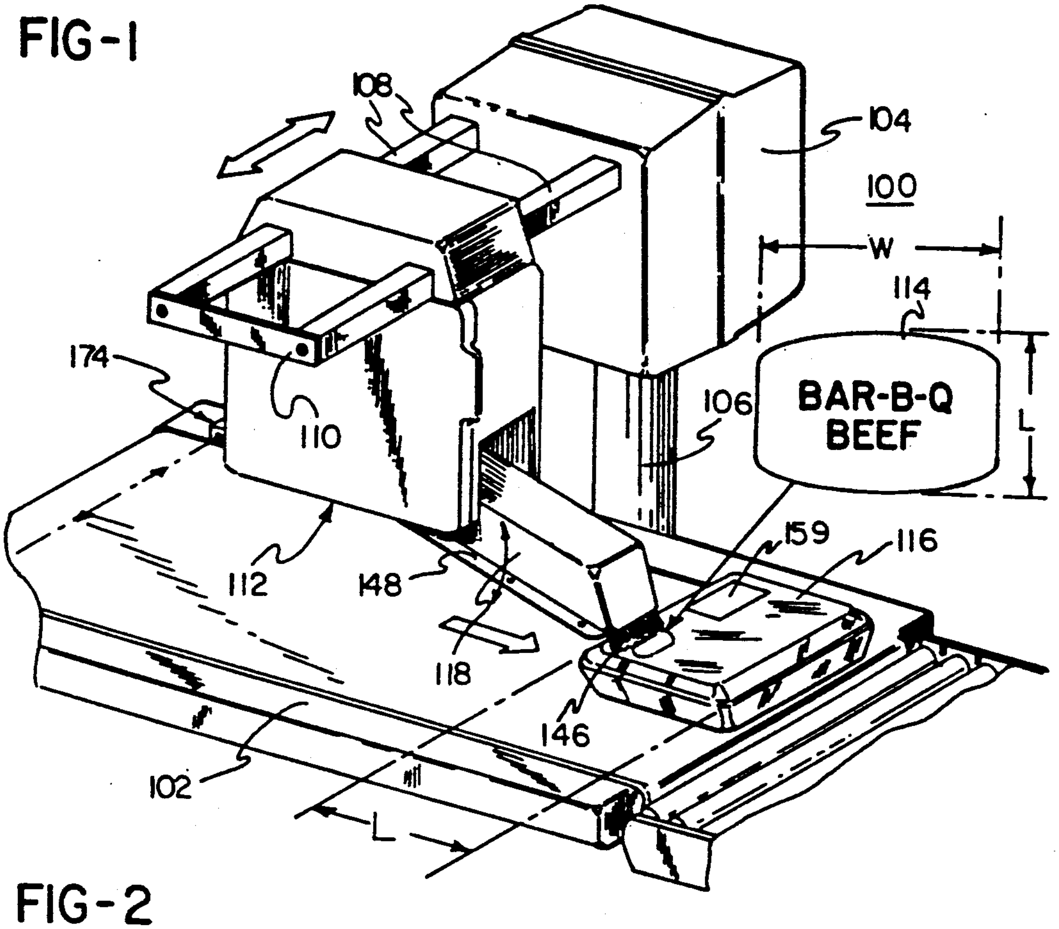
FIG. 1 is a perspective view of a preferred embodiment of a merchandising label printer/applier of the present invention associated with a package conveyor.

A labeling system 100 in accordance with the present invention is shown in perspective view in FIG. 1 together with a package conveyor 102 which carries packages to be labeled by the labeling system 100. The labeling system 100 comprises a control housing 104 supported upon a stand 106. Cantilevered support rails 108 extend out the side of the control housing 104 and are secured to one another by means of a stabilizing bridge member 110 at their distal ends. Labeler means 112 is supported for movement along the rails 108 such that the labeler means 112 can be moved laterally relative to the package conveyor 102, also see FIG. 10. The labeler means 112 applies labels 114, for example, thermally printed merchandising labels, to the top surfaces of packages 116 as the packages 116 are carried along the conveyor 102. Although labels to be applied and packages can vary, they will be referred to throughout by the numerals 114 and 116, respectively.

Figure 4:
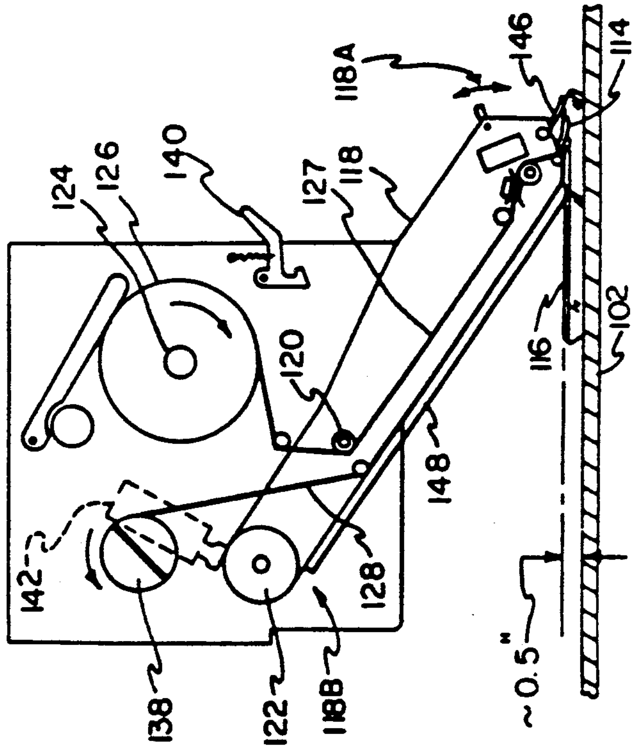
FIGS. 4 and 5 illustrate the pivoting motion of the labeling arm of the preferred embodiment of the present invention to accommodate a substantial range of package heights.
Figure 5:
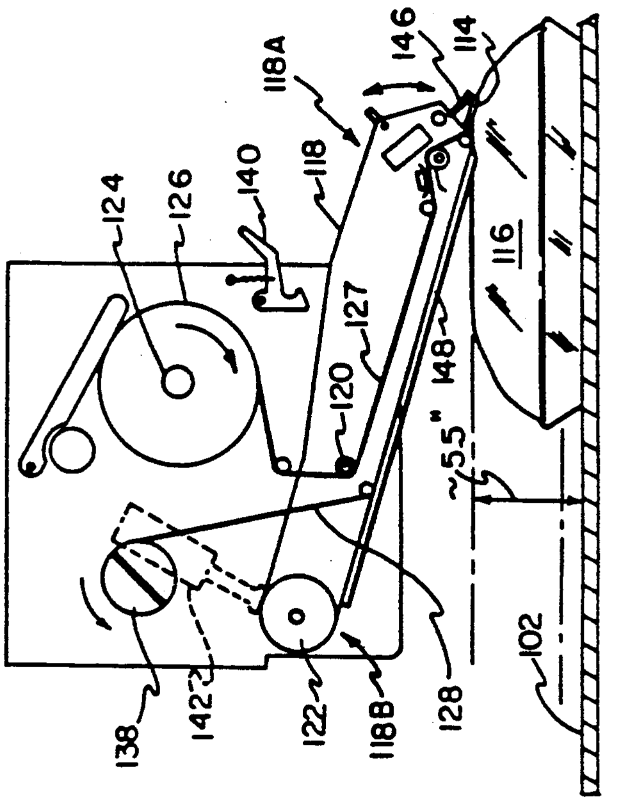

The labeler means 112 comprises a pivotally mounted labeling arm 118 as best shown in FIGS. 2, 4, 5, 7 and 9. As shown in FIGS. 4 and 5, the labeling arm 118 is mounted for pivotal movement about a shaft 120. The major portion of the labeling arm 118 extends beyond the shaft 120 toward the distal label applying end 118A of the arm 118 such that it is biased by gravity toward a lowermost position adjacent the package conveyor 102. To counterbalance the label applying end 118A of the arm 118, a weight cylinder 122 is secured to the opposite end 118B of the arm 118.

Figure 2:
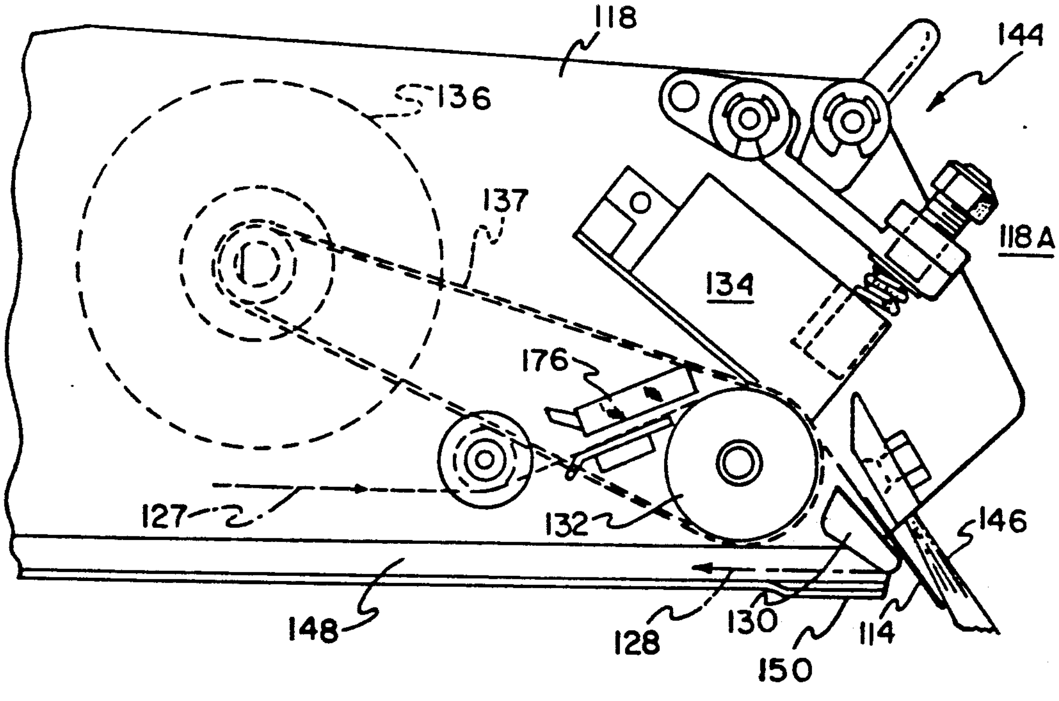
FIG. 2 is a partially broken away side view of the distal end of a pivotally mounted labeling arm of FIG. 1.

The balance of the labeling arm 118 about the shaft 120 is such that packages can pass thereunder and move the arm 118 upwardly to accommodate a substantial range of package heights yet sufficient force is exerted on packages to apply labels. For example, packages varying in height from a minimum height of approximately 0.5 inches up to and including a maximum height of approximately 5.5 inches can pass beneath the labeling arm 118 and be labeled thereby. The labeler means 112 also comprises a supply spindle 124 for receiving a spool 126 of unprinted label stock 127 comprising pressure sensitive labels 114 carried upon a backing strip 128. A label stripper bar 130, shown in side view in FIG. 2, is mounted at the distal end of the labeling arm 118 to peel labels from the backing strip 128 as the label stock is tightly drawn over the bar 130.

Preferably, the labeling system 100 also prints the labels which are applied by the labeling arm 118. For printing labels, drive means for engaging and moving the label stock 127 comprises a backing roller 132 and a thermal print head 134 with the label stock 127 being received between the backing roller 132 and the print head 134 such that the labels 114 are positioned toward the print head 134, see FIG. 2. A stepper motor 136 is coupled to the backing roller 132, for example by a drive belt 137, to advance and retract the label stock 127. The backing strip 128 is maintained in tension by a take-up spindle 138 which receives and tensions the spent backing strip 128 after labels are removed therefrom by the label stripper bar 130 and applied to packages, see FIGS. 4 and 5. The spindle 138 is driven by a second motor (not shown) through a slipping round belt drive to maintain tension in the backing strip 128 yet to prevent overtensioning and to permit the label stock 127 to be moved in the reverse direction. The second motor drives the spindle 138 whenever the stepper motor 136 is operated to advance the label stock.

Figure 6:
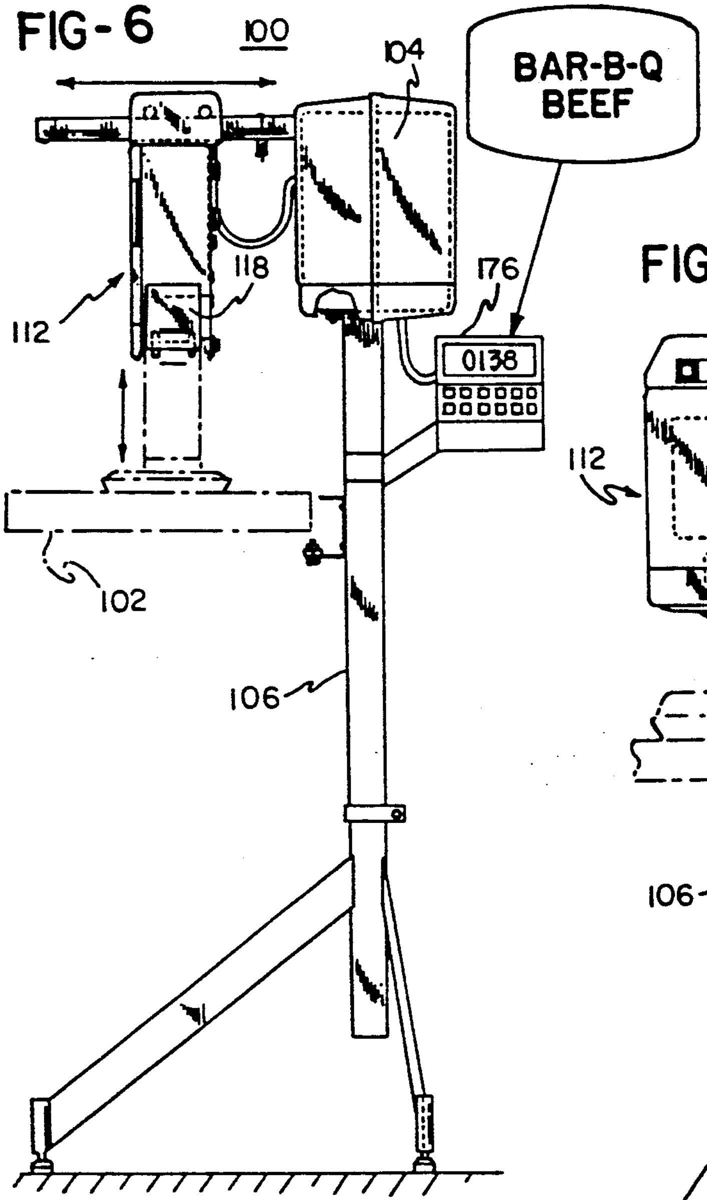
FIGS. 6 and 7 are an end and side view, respectively, of a label printer/applier mounted upon a support stand which facilitates coupling the label printer/applier to a package conveyor.
Figure 7:
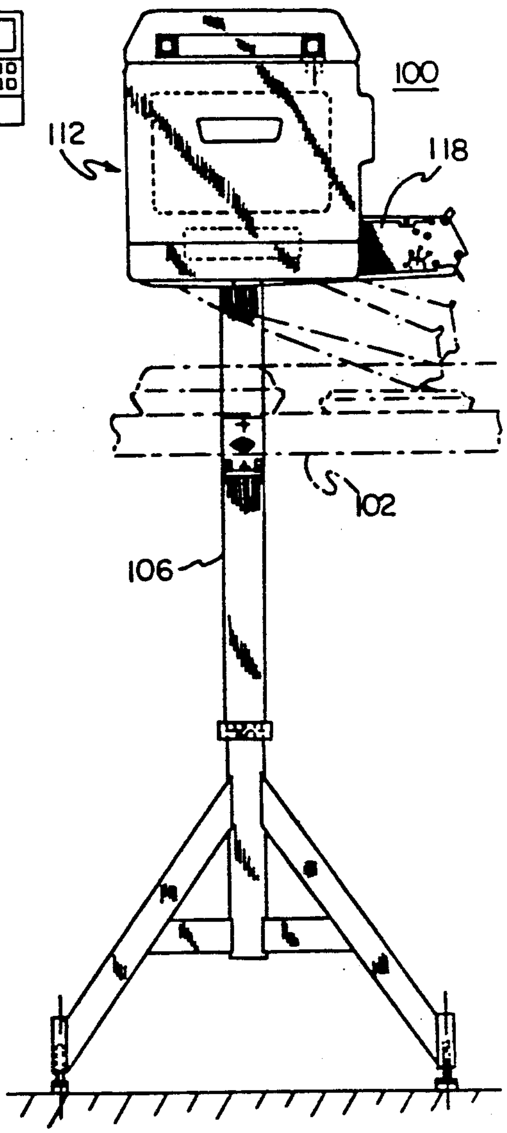

The labeling arm 118 can be latched into an upward position away from the conveyor 102, as shown in the solid line drawings of FIGS. 6 and 7, by means of a spring biased latch member 140 shown in FIGS. 4 and 5. To smooth the dropping movement of the label applying arm 118 from its upward position maintained by the latch member 140 to its lowermost position adjacent the package conveyor 102, a damping shock absorber 142 is preferably positioned to slow the descent of the arm 118. The print head 134 can be released and pivoted upwardly for label threading and print head cleaning by means of the mechanism 144 shown in FIG. 2. Label smoothing means taking the form of a downwardly extending tapered brush 146 in the illustrative embodiment, extends beyond the label stripper bar 130 for engaging and evenly pressing labels 114 against packages 116 to which they are applied. Sled runners 148 are secured along the bottomsides of the labeling arm 118 to facilitate passage of a wide variety of package heights beneath the arm 118.

Figure 8:
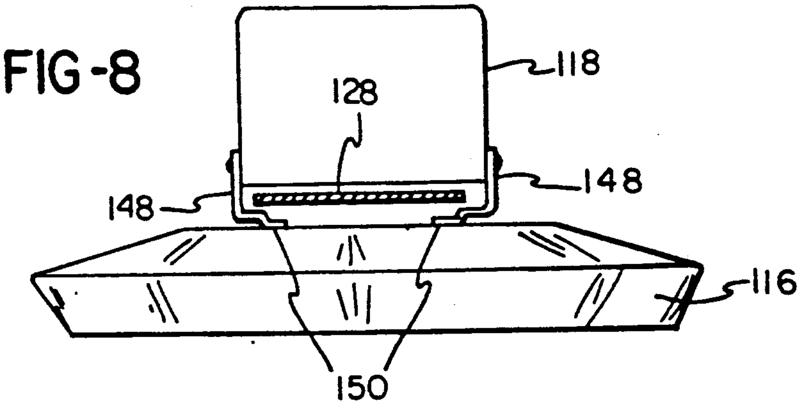
FIG. 8 shows a schematic end view of a labeling arm illustrating package contact with sled runners secured along the lower edges of the arm.

It is apparent from a review of FIGS. 4 and 5 that any package within the substantial range of package heights extending from a minimum height of approximately 0.5 inches through and including a maximum height of approximately 5.5 inches will engage the sled runners 148 to pivot the labeling arm 118 upwardly for package labeling. Accordingly, the sled runners 148 are preferably formed from stainless steel and are "sandblasted" to form a pebble-like face on their lower surfaces such that the sled runners 148 do not adhere to the plastic stretch wrapping material which is commonly used to wrap packages in supermarkets. Further, as is apparent from FIG. 8, the sled runners 148 present relatively narrow edges for contacting packages to thereby minimize frictional contact between the runners 148 and packages being labeled.

The sled runners 148, at least near their distal ends, have downwardly extending inner ends 150 which serve an additional purpose of reducing potential contact between the spent backing strip 128 and packages passing beneath the arm 116. While the spent backing strip 128 is maintained taut by the take-up spindle 138, in some instance, such as for highly crowned products like ground meat, it may still be possible for the backing strip 128 to come in contact with the package being labeled. Such contact could interfere with package labeling since the spent backing strip 128 tends to adhere tenaciously to the stretch plastic wrapping material commonly used to wrap packages and since the backing strip 128 travels in the direction opposite to that of packages being labeled.

Figure 3:
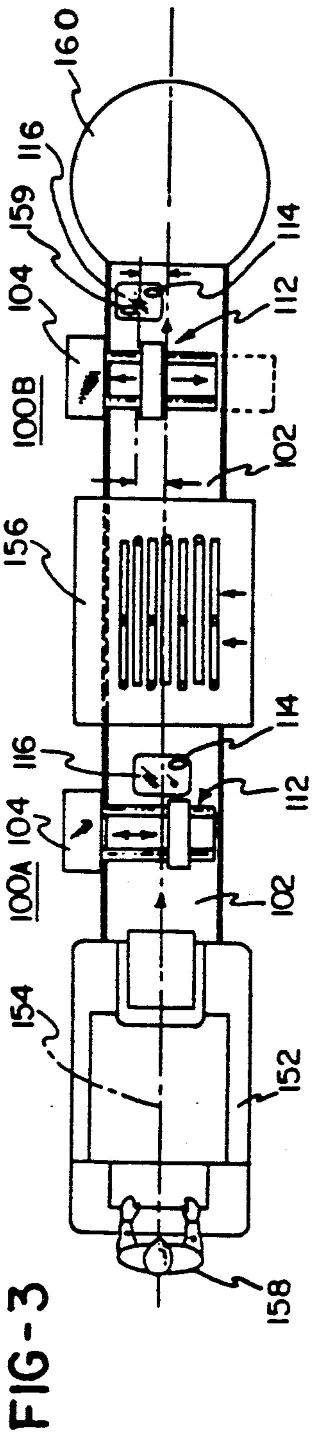
FIG. 3 is a plan view of a packaging system including redundant merchandising label printer/appliers of the present invention to show labeling packages which are aligned either along the center line or along one side of a conveyor for applying two merchandising labels to each package.

The versatility of the labeling system 100 in accordance with the present invention is shown in FIG. 3 which shows two merchandising labeling systems 100A and 100B. FIG. 3 illustrates how two merchandising labels can be applied to packages and also the ability of the system to label packages which are aligned either on the center line of the conveyor 102 or to one side thereof. For example, packages which are wrapped on a Hobart ESW Automatic Wrapping Machine 152 as illustrated in U.S. Pat. No. 4,510,731, exit the wrapping machine centered upon the center line 154 of the conveyor 102. These packages are labeled by the labeling system 100A by moving the labeler means 112 laterally across the conveyor 102 to a selected lateral position. The package 116, after being labeled by the merchandising labeling system 100A, is carried to a pricing labeler 156 such as the indexing label applier (ILA) 156 as disclosed in U.S. Pat. No. 3,878,909.

The ILA 156 moves packages to the upper side of the machine as shown in FIG. 3 for price labeling such that the packages are side justified, left side justified as viewed by an operator 158 of the ESW Wrapping Machine 152, when the packages are passed to the exit conveyor 102. Such side justified packages can also be labeled by the labeling system 100B by laterally moving the labeler means 112 to a selected lateral position. The location of labels 114 applied by either the labeling system 100A or 100B is such that the merchandising labels 114 do not interfere with pricing labels 159 which are applied by the ILA 156. Of course the labeling system 100B can be converted to right-hand side justification and positioned to the right-hand side of the conveyor 102 if packages are right-hand side justified by the packaging apparatus utilizing the labeling system 100 of the present invention. Such conversion can be performed using the same parts which are merely rearranged to accommodate the desired side justification. In any event, packages which have been both price labeled and labeled with merchandising labels are passed to a rotating bin 160 where they are collected for retrieval and placement in a display case.

Applicant has determined that five different lateral locations across the conveyor 102 are satisfactory to label packages which are oriented along the center line of the conveyor 102 or which have been justified to one side of the conveyor 102. These positions are shown schematically in FIG. 10 and are indicated by the numerals 1 through 5. As will be described hereinafter, labels applied by the labeling system 100 of the present invention, are also positioned in preferred areas between the leading side edges and the trailing side edges of the top surfaces of packages labeled. As will be apparent, label positioning between the leading side edges and the trailing side edges of packages can be essentially at any point therebetween. However, in accordance with the preferred embodiment of the present invention, the labels are applied adjacent the leading side edges or the trailing side edges such that the five lateral locations 1 through 5 are defined to be adjacent the leading edge of a package, and five additional label locations 6 through 0 are in corresponding lateral locations, but positioned adjacent the trailing edge of a package.

Figure 12:
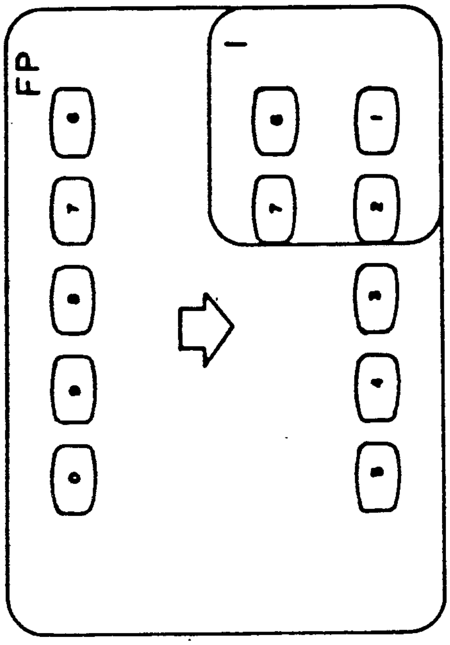
FIGS. 12 and 13 show label application for the smallest and largest packages presently labeled for side justified and center line aligned packages, respectively.
Figure 13:
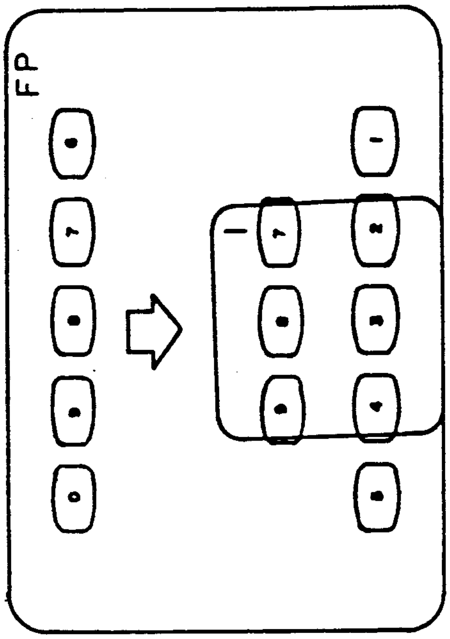

Some of the designated label positions 1 through 0 will be unavailable for some of the packages. For side justified packages, the labeling position 1 will be approximately constant for all packages in that it is nominally a defined distance from the side edges of the packages and nominally a defined distance from the leading side edges of the packages. For center line aligned packages, the labeling position 3 will be approximately constant for all packages in that it will be centered upon the packages at a nominally defined distance from the leading side edges of the packages. Representative labeling positions for the smallest and the largest packages presently known to be utilized in supermarkets and to be labeled by the labeling system 100 are shown in FIG. 12 for side justified packages and in FIG. 13 for center line aligned packages.

Figure 10:
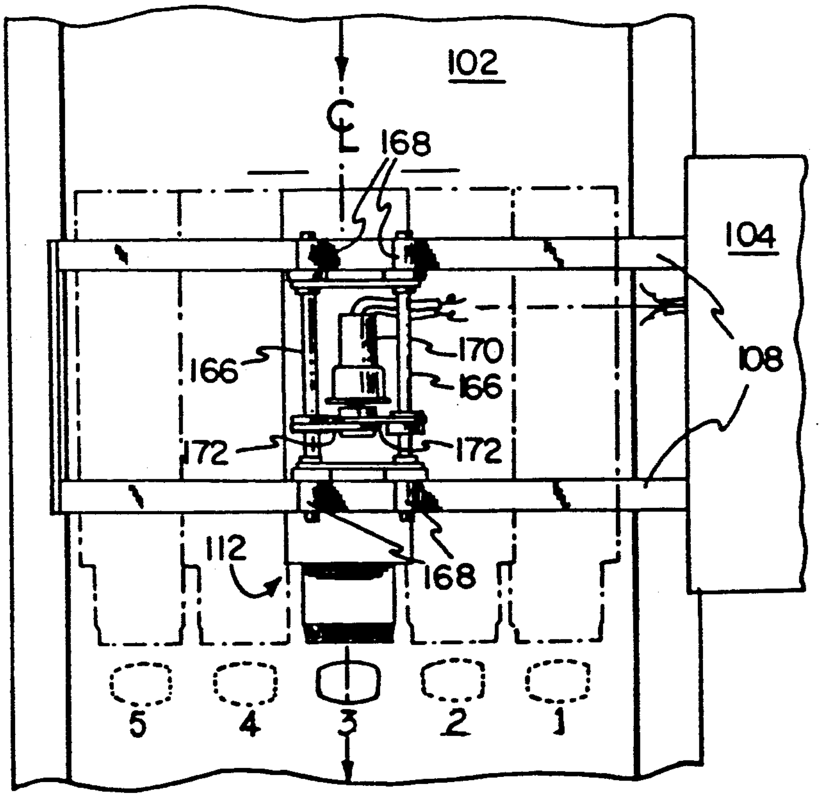
FIG. 10 illustrates five (5) different lateral label application locations which can be selected in the preferred embodiment of the label printer/applier and the drive mechanism for moving the label printer/applier laterally along its support rails.
Figure 11:
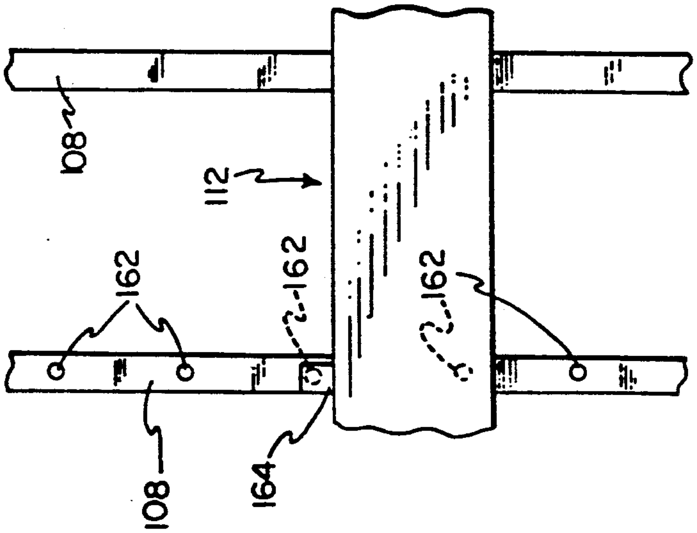
FIG. 11 illustrates the lateral positioning of the label printer/applier by means of an optical sensor and holes formed in the underside of one labeler support rail.

An arrangement for determining the five lateral locations illustrated in FIG. 10 is shown in FIG. 11 with the five positions of the labeler means 113 laterally across the conveyor 102 being defined by means of holes 162 formed in the underside of one of the support rails 108. The holes 162 are sensed by an optical sensor 164 positioned on the labeler means 112 to scan the bottom of the rail 108 for locating/monitoring the holes 162 or other positioning indicia which could be placed along the rails 108. The use of the holes 162 on the underside of one of the rails 108 has been found to be preferred since the holes 162 can be easily sensed by the optical sensor 164 yet cannot be worn away, filled with dirt or otherwise easily obstructed such that inaccurate positional readings are obtained.

An illustrative drive mechanism for moving the labeler means 112 laterally along the rails 108 is shown in FIG. 10 wherein the labeler means 112 is supported on the rails 108 by means of a pair of drive axles 166. The drive axles 166 include axial extensions 168 which rest upon and frictionally engage the tops of the rails 108 to move the labeler means 112 back and forth along the rails 108. The axles 166 are driven by a DC motor 170 which is coupled to the drive axles 166 by means of belts 172, or the like. Label positioning can of course be set to any reasonable number of positions along the rails 108. Also, if different positions are desired, a user can interchange the rails 108 and drill or otherwise form new holes in the bottom of the previously solid rail to define such positions. Operation of the labeling system 100 of the present invention to apply labels to preferred areas of the top surfaces of packages between the leading side edges and the trailing side edges of packages carried on the conveyor 102 will now be described with reference to FIGS. 1 and 9. While preprinted labels can be applied by the labeling system 100, preferably the labels are printed by the labeling system 100. Printing is a requirement in the case of pricing labels and a great advantage in the case of merchandising labels since any message can be printed on blank labels as the need arises and large inventories of preprinted labels are then not required. Accordingly, operation will be described for printing and applying labels to substantially rectangular packages each having a top surface, a bottom surface, a leading side edge and a trailing side edge as defined by the direction of package conveyance as the packages are carried along a conveyor.

As shown in FIG. 1, the labeler means 112 is positioned over the conveyor 102 with the labeling arm 118 being biased by gravity toward a lowermost position adjacent the conveyor 102 but upwardly movable by packages 116 passing thereunder to accommodate a substantial range of package heights. See also FIGS. 4, 5 and 7. Lateral positioning of the labeler means 112 relative to the conveyor 102 and the material to be printed on labels is preset into an electronic controller (not shown) in the control housing 104 or may be passed to the controller from an associated second labeler, such as, a price labeler. Packages 116 on the conveyor 102 are sensed by means of an optical sensor 174 as they move toward the labeling arm 118. Upon the sensing of a package by the sensor 174, a label is printed by the coordinated operation of the print head 134 and the backing roller 132 which is synchronously driven by the stepper motor 136 via the drive belt 137.

Once a label has been printed, it extends beyond the printing line of the print head 134 and remains secured to the backing strip 128 since the spacing between the print head 134 and the stripper bar 130 is approximately equal to the length of labels 114 to be handled by the labeling system 100. The length (L) of the labels 114 is defined as the dimension in the direction of label stock 127 movement with the width (W) being perpendicular thereto as shown in FIG. 1.

The printed label 114 is thus held still secured to the backing strip 128 adjacent the stripper bar 130 until a period of time, based upon package sensing, has expired. The printed label 114 is then ejected by advancement of the label stock 127 as it is tightly conveyed around the stripper bar 130. The advancement of the label stock 127 also advances the next adjacent unprinted label partially beyond the print head 134 which is deactivated such that the label remains unprinted. The label 114 which was just printed and is being applied must be held in its application position after it is fully ejected for a sufficient period of time such that it will engage and be secured to the package to which it is to be applied. In accordance with a working embodiment of the present invention, an effective post ejection holding time period has been found to be 50 milliseconds. While this period may sound brief, it is essential for high reliability since labels may not be applied or can be misapplied if the post ejection holding time period is omitted.

Upon the expiration of the post ejection holding time period, the stepper motor 136 is operated in the reverse direction to retract the label stock 127 until an edge of the next unprinted label to be printed is detected by an optical label sensor 176 at which point the unprinted label is beneath the print head 134 in a position to be printed. The labeling system 100 is then ready for another operating cycle which is commenced by the sensing of a package by the package sensor 174. One message may be printed upon the label 114 which was applied to a package and a different message can be printed upon the next adjacent unprinted label which was just repositioned beneath the print head 134 such that there is no waste of labels when products or label messages are to be changed. This is important since statistically, such messages are changed in a typical supermarket every 6-8 packages.

Messages to be printed, for example merchandising label messages, are stored in memory of the controller within the control housing 104. Preselected messages are stored in read only memory (ROM) and user generated messages entered by means of a control console 176, see FIG. 6, which is preferably provided with the labeling system 100, are stored in random access memory (RAM). In one working embodiment of the label system 100, storage for up to 1000 messages is provided with 500 preprogrammed and 500 programmable by the user. Messages can be recalled for printing by entering a code number identifying the desired message. The positioning of a label between the leading side edge and the trailing side edge of a package is determined by the delay time selected between the time of package sensing and the time a printed label is ejected for application. The delay time is calculated for each package to be equal to the travel time of the package 116 from the time it is sensed by the package sensor 174 until the labeling arm 118 is positioned to apply a printed label to the preferred area of the top surface of the package 116. The delay time can be timed from the time that a label is printed, which in a working embodiment of the invention, requires 154 steps of the stepper motor 136 at 4 milliseconds per step (616 milliseconds).

Alternately, the travel time can be calculated from package sensing such that the travel time is equal to the sensor distance in inches from the package sensor 174 to the tip of the labeling arm 118 plus an offset, which is the distance in inches from the leading side edge of the package 116 to the label application point within the preferred area of the top surface of the package 116, divided by the speed of the conveyor in inches per second. Labels can be applied at effectively any location between the leading side edges and the trailing side edges of packages. However, in accordance with the preferred embodiment of the present invention, labels are applied adjacent the leading side edge or trailing side edge, with the edge of the labels being approximately one inch in from the selected side edge of the package.

Figure 9:
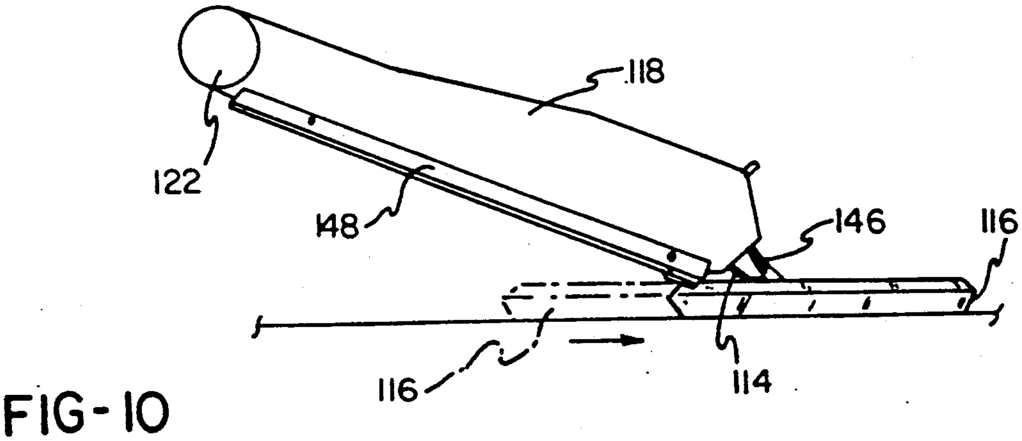
FIG. 9 illustrates label application adjacent either the leading side edge or the trailing side edge of a package.

The electronic controller (not shown) within the control housing 104 performs a calculation to determine the delay time based on the sensing of a leading edge of the package alone, if a label is to be positioned adjacent the leading side edge of the package. If the label is to be positioned adjacent the trailing side edge of the package, the controller must know the package length, i.e., the dimension of the package in the direction of conveyance as shown in FIG. 1. Accordingly, the controller will also use the sensor 174 indication of the trailing side edge of the package 116 to determine the package length and thereby determine the offset such that the label is applied with its trailing edge approximately one inch from the trailing side edge of the package. As shown in FIG. 9, a label is being applied adjacent the trailing side edge of the full line package 116 and adjacent the leading side edge of the phantom line package 116.

Positioning the labeler means 112 laterally across the conveyor together with labeling adjacent either the leading side edge or the trailing side edge of packages leads to ten different labeling positions identified by the numerals 1 through 0. All ten positions are possible for the largest packages standardly handled, referred to as family packs (FPs), whether the packages are center line aligned or side justified. These positions are shown for left side alignment in FIG. 12 and for center line alignment in FIG. 13. It should be apparent that not all ten locations can be defined for all different package sizes. To illustrate labeling locations which are available for alternate package sizes, the smallest size package, a size 1 package, also is shown for both the left justified alignment in FIG. 12 and the center line alignment in FIG. 13.

A method and apparatus for applying labels to packages as they are carried along a conveyor wherein a substantial range of package heights can be accommodated without requiring height adjustments of the labeler and wherein the labels can be positioned within preferred areas of the upper surface of the packages has been disclosed.

While the methods herein described and the form of apparatus for carrying this method into effect, constitute preferred embodiments of the invention, it is to be understood that the invention is not limited to this precise method and form of apparatus and that changes may be made in either without departing from the scope of the invention which is defined in the appended claims.

What is claimed is:

1. A method for printing and applying merchandising labels to substantially rectangular packages, each package having a top surface, a bottom surface, a leading side edge and a trailing side edge as defined by the direction of package conveyance, said method comprising the following steps:

positioning a label printer and applier over an essentially horizontal conveyor carrying packages to be labeled, said label printer and applier being biased by gravity toward a lowermost position adjacent said conveyor but movable by packages passing horizontally thereunder to accommodate a substantial range of varying package heights;

sensing the leading and trailing side edges of packages on said conveyor as they move toward said label printer and applier;

printing a label upon sensing the leading side edge of a package;

holding the printed label for a period of time based upon package sensing of both the leading and trailing side edges; and applying the printed label upon the expiration of said period of time whereby the printed label is applied to a preferred area of the top surface of said package an approximate preselected distance from either the leading side edge or the trailing side edge.

2. A method for printing and applying merchandising labels to substantially rectangular packages as claimed in claim 1 wherein said preferred area of top surface of said package is adjacent the trailing side edge of said package, and wherein the period of holding time is determined in accordance with the sensed length of the package.

3. A method for applying merchandising labels to packages as the packages are carried along a conveyor, each package having a top surface, a bottom surface, a leading side edge and a trailing side edge, the method comprising the steps of:

positioning a label applier over a conveyor carrying packages to be labeled, said label applier having a label print head and being adapted to apply a printed label on the top surface of a package conveyed thereunder;

sensing the leading edge of a package conveyed along the conveyor;

printing a label upon sensing the leading edge of the package;

sensing the trailing edge of the same package;

determining the length of the package based on the sensed distance between the leading and trailing side edges thereof;

timing the issuance of the printed label from the label applier in response to the sensing of the trailing side edge; and applying the label a predetermined distance from the trailing side edge.

* * * * *